(12) United States Patent
Biggs, Sr.

(10) Patent No.: US 6,279,928 B1
(45) Date of Patent: Aug. 28, 2001

(54) COMPARTMENTALIZED CONTAINER

(76) Inventor: Venor Lennox Biggs, Sr., 5431 Taney Ave., Alexandria, VA (US) 22304

( * ) Notice: Subject to any disclaimer, the term of this patent is extended or adjusted under 35 U.S.C. 154(b) by 0 days.

(21) Appl. No.: 09/471,095

(22) Filed: Dec. 23, 1999

(51) Int. Cl.⁷ ................................................. B62D 21/14
(52) U.S. Cl. ................................... 280/47.19; 280/47.18; 280/47.26; 280/79.11
(58) Field of Search ................................ 280/79.11, 79.2, 280/79.3, 79.6, 79.7, 47.34, 47.35, 47.131, 47.11, 47.19, 47.24, 47.26, 37, DIG. 5

(56) References Cited

U.S. PATENT DOCUMENTS

| | | | |
|---|---|---|---|
| 3,638,717 | * 2/1972 | Harbour et al. | 165/263 |
| 4,066,156 | * 1/1978 | Basile | 206/315.1 |
| 4,635,657 | * 1/1987 | Stanford | 132/286 |
| 4,915,430 | * 4/1990 | Vitale | 360/92 |
| 5,071,147 | * 12/1991 | Stansbury | 280/47.19 |
| 5,207,723 | * 5/1993 | Newby, Sr. | 312/249.11 |
| 5,244,267 | * 9/1993 | Fossier, Jr. et al. | 312/231 |
| 5,765,717 | * 6/1998 | Gottselig | 221/45 |
| 5,997,112 | * 12/1999 | Karten et al. | 312/140.2 |

* cited by examiner

*Primary Examiner*—Brian L. Johnson
*Assistant Examiner*—Elaine Gort
(74) *Attorney, Agent, or Firm*—Robert Halper

(57) ABSTRACT

A compartmentalized container of injection molded plastic having hinged doors and a hinged cover is used to store and ship foldable chairs and a foldable table, wherein the folding chairs are stored in supports fixed on the doors and a foldable table is stored in a support mounted on the back side of the container. In closed position of the container, the foldable table underlies the foldable chairs. The doors are secured by clamps and the cover is bent down to overlap the doors and is secured to the door by a latch. The container is made spacious enough to store and transport goods other than chairs and tables. If necessary wheels can be attached to the container at the bottom back side and a gripping device can be fashioned at the top back side.

13 Claims, 2 Drawing Sheets

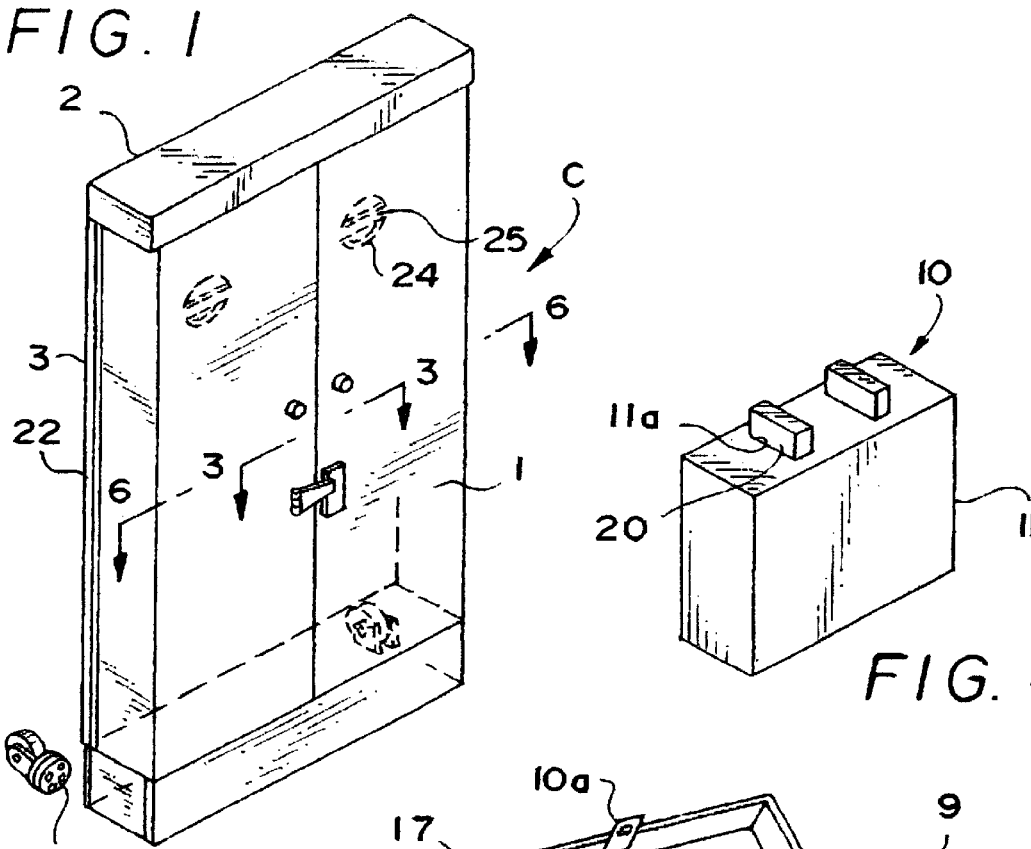
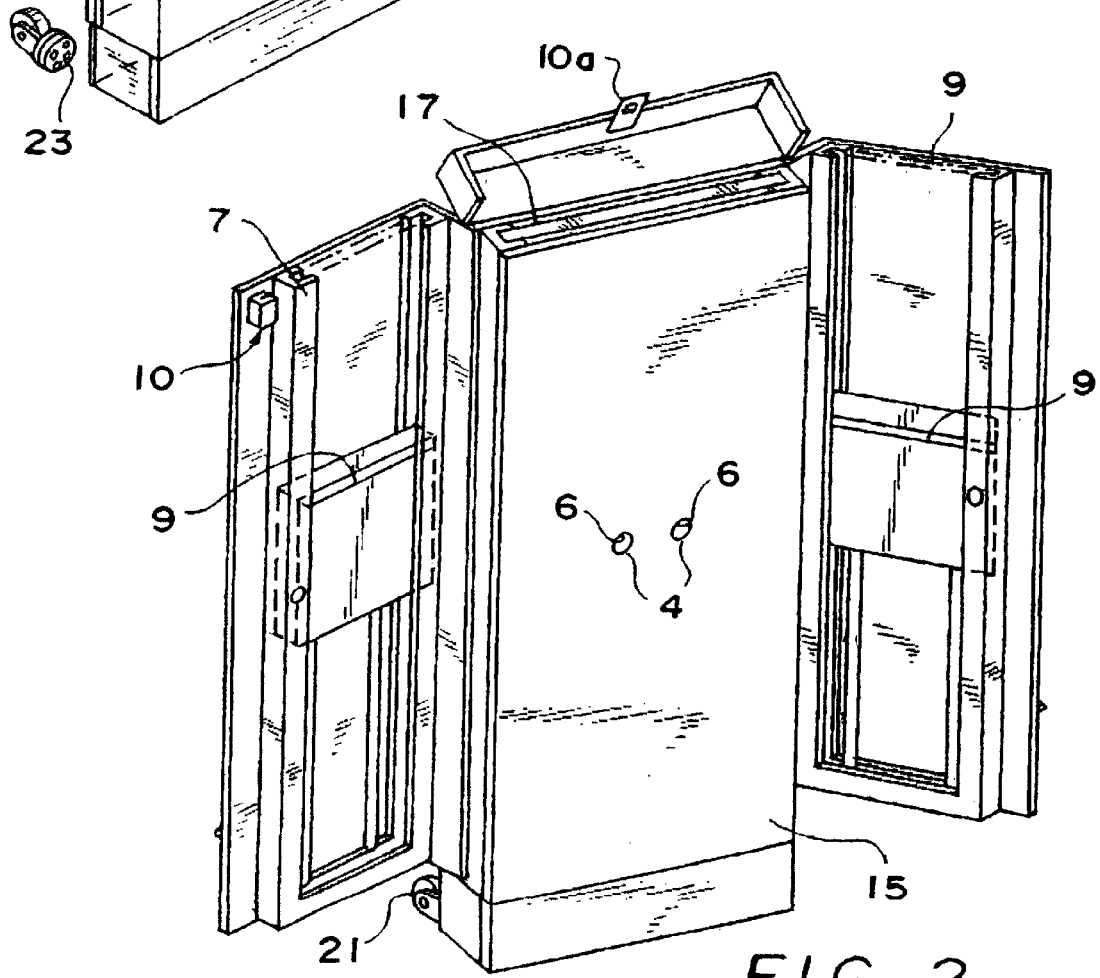

COMPARTMENTALIZED CONTAINER

FIELD OF INVENTION

This invention pertains to a compartmentalized storage container that can also be used to transport and ship articles such as chairs and tables.

As determined by the prior art described below, there are a number of containers for storage and shipping.

U.S. Pat. No. 1,783,712 is directed to a portable lavatory, equipped with receptacles for toilet accessories which may easily be folded into a portable package or unfolded and set up for use. A rectangular frame consists of side boards, a top and four legs. There is also a rectangular leg frame. The legs are all fastened by screws. There is a wash stand in the top, a backboard with mirror. There are two backboard leaves hingedly connected to the backboard. On the sides of the stand top are hinged leaves. The backboard leaves have pockets for toilet accessories. to pack the stand, screws are removed from the legs, the leaves are folded over the backboard. The soap holder is swung upward to disengage a lug from the flange of the bowl. Then the folded leaves are turned down to overlie the stand top. The towel rods are removed from their arms. the top leaves that held the towel rods are turned over to lie on top of the backboard Another set of arms lie alongside the end boardsThe leg parts are packed around the edges of the bowl and one leg frame is stowed on top of them.

U.S. Pat. No. 1,951,604 shows a bag for folding chairs, for storage and transportation. The bag is made of a single piece of canvas. There are provided a number of fabric partitions to keep the chairs separate from each other. To receive the chairs the bag is opened up. Folding chars are inserted into the tops of each of the compartments. A strap is then threaded through several slots of the dividing walls and the free ends of the strap tied in a loop. The strap serves to prevent the free ends of the chairs from rubbing against each other if the dividing wall sags. Then the flaps of the bag are turned down and a strap that extends all around the bag is tightened. Securing loops around this strap serve as a handle.

U.S. Pat. No. teaches 2,387,790 a multicompartment carton that is capable of displaying as well as retaining packaged articles. There is formed a book-simulating carton having a plurality of compartments effectively arranged for display when the book is opened. The carton is prepared from folding of a prepared single blank of sheet material such as paper board. The blank comprises a series of panel members arranged in side by side alignment. Certain of the panel members are provided with appurtenant top and bottom extensions which provide end closures for the compartments. In folding the blank to form a book-like carton, inner panel members 23 are above outer panel members 16. Internal panels 22, 24 provide the lateral walls of the cover compartments. Spacing panel members 32 are superimposed in face to face contact on the inner margins of outer panels 16 and intermediate compartment forming panels 34 are made to stand up in mutual opposition at the lateral margins of the central panel 10. The carton in question shows smoking tobacco in pockets of panel members 23 and a pipe in intermediate panel 10.

U.S. Pat. No. 2,418,731 depicts a knockdown baby chair made in sections which are assembled by sliding connections to be quickly disassembled and packed in a compact bundle for transport. Assembly is quick and without special tools. The high chair has two sides, a back, seat and tray. Each side has two legs, a slot therebetween and a shoulder. A pair of top and bottom angle irons extend from the rear to the sides. After the sides are assembled with the back, the seat is assembled, the angle irons depending therefrom fitting in sockets to tie down the back sides and seat together. The tray is then put on the high chair, the tray also having angle irons fitting into sockets. The high chair is secured on a conventional chair with straps passing through the slots. When disassembled, the chair is packed in a valise that is provided with compartments.

U.S. Pat. No. 2,547.661 illustrates an extendible table combined witha kitchen cabinet. In use when doors 17, 18 of the cabinet are closed, table numbers 23 will be positioned in the space 22 formed between the top 12 and the inner wall 21. When it is desired to use the table, either one or both doors can be swung outwardly to an extended position. The doors may be latched in their open position. When the doors are opened, stools 34 may be removed from compartment 33, normally closed when the doors are in closed position.

U.S. Pat. No. 2,660,228 is another example of a knockdown chair of the type used in the living room. This chair can be easily disassembled for shipping. there are two mating portions, the back rest and seat which are separable from one another with the arms being swingable to a vertical position and releasbly bolted to the back rest. The legs are also bolted to the seat, and the seat is pinned to the back rest. A box is shown for packing the disassembled elements, the legs being placed within type seat interior and the head rest and arms placed below the seat.

U.S. Pat. No. 4,957,201 shows a shipping carton for folding tables having detachable table tops, each table top being attachable to a support base including two pair of pivotably connected legs. The carton receives table tops in top to bottom relationship oriented so that they are parallel to the side walls of the enclosure. The carton also receives corresponding numbers of support bases having two pairs of legs in closed position. One half of the bases are arranged in a side by side first stack between one side of the vertical stacks of table tops, and with the other half arranged in sided by side second stack between the opposite side of vertical stacks and the opposite side of the container from the first side wall.

While there are a number of containers for storage and transport, none of these containers show the combination of a foldable table foldable chairs that are arranged in a very compact manner and are easily removable and assembled.

It is an object of this invention to provide a rigid, lightweight container that provides for storage and transport of at least two foldable chairs and a foldable table.

It is a further object of this invention to assemble chairs and table that once unfolded are ready for use without any accessories for assembling.

It is also an object of this invention to provide a container wherein the objects in the container are held securely in place but easily releasble.

SUMMARY OF THE INVENTION

The storage and shipping container is made of injection molded plastic using a thermosetting resin such as a polyester. The container has a top side with two hinged doors. A hinged cover adjacent one end of the doors and a closed back end. The doors are held in closed position by a pair of spaced magnetic clamps that are placed on the the inner side of the doors, or alternatively the doors are secured by a spring type latch, such as found in brief or dispatch cases. In the case of the magnetic clamps the doors are opened by attaching a knob on each door exterior. In the case of the latch type closure, pressure on the latch will release the spring allowing the doors to open. The edge of the cover is hinged so that its inner edge slightly overlies the doors to open when closed, and is secured by a latch interconnecting the cover with one of the doors. The latch also aids in securing the doors. Adhesively or integrally secured to the inner side of each door are a pair of channels into which a conventional folding chair is inserted. To hold the chairs in place in the event the length of the channels are greater than that of the chairs removable slats can be placed in the channels to hold the doors in place. Similarly a conventional folding table is stored between a pair of spaced channels adhesively bonded or integral with the inner back side of the container. The folding table is placed below the channels holding the chairs and a partition separate the channels holding the chairs and table. On assembly all that is necessary is to unlatch the doors, swing them open, slide out the chairs and unfold them. after the chairs are removed and with the doors still open, the table is removed from the back side and unfolded. Both chairs and table are ready for use. The container can also be enlarged to store other articles besides chairs and a table. Additionally to facilitate transport, wheels can be attached to the lower back side and a gripping means can be fashioned at top rear.

BRIEF DESCRIPTION OF THE DRAWINGS

FIG. 1 is a front perspective view of the of the container in closed position.

FIG. 2 is a front perspective view of the open container.

FIG. 4 is partial enlarged view of FIG. 2 of FIG. 1 showing the latch mechanism for the cover and door.

DETAILED DESCRIPTION OF THE INVENTION

Figure 6:
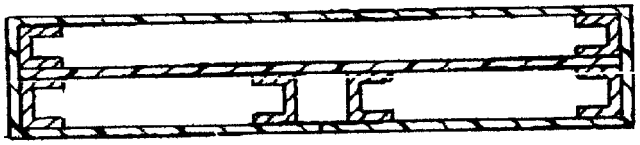
FIG. 6 is a section taken on line 6—6 of FIG. 1
Figure 5:
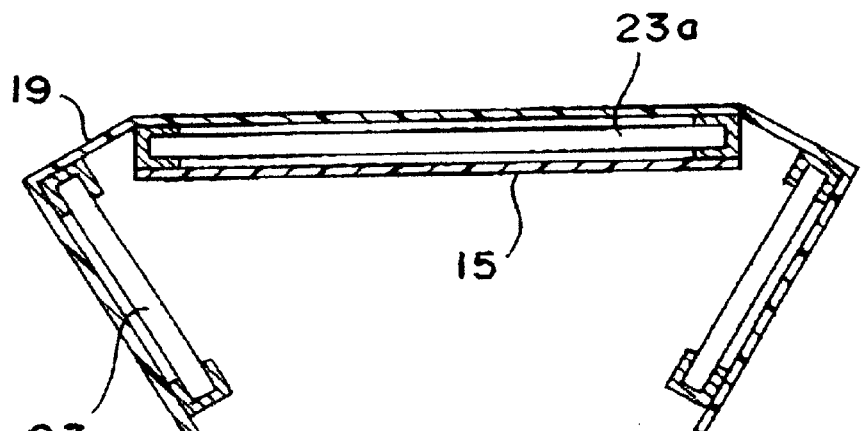
FIG. 5 is a section on line 5—5 of FIG. 2
Figure 3:
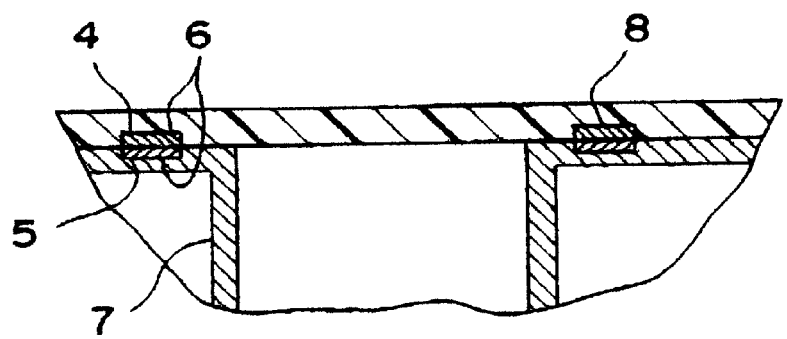
FIG. 3 is a sectional view taken on line 3—3 of FIG. 1 showing the magnetic clamps.
Figure 7:
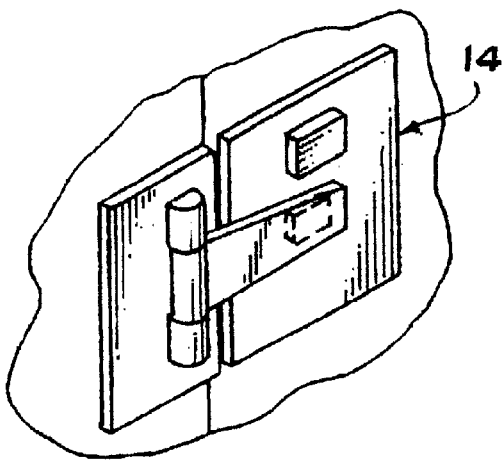
FIG. 7 is an enlarged view showing the latch mechanism for the doors.

FIG. 1 sows a container C in closed position having doors 1, cover 2 and closed end 3. The doors are held in closed position by a pair of clamps 4. The clamps comprise magnetic discs 5 of high intensity inserted in openings 6 in channels 7 and adhesively secured therein. (See FIG. 3) The circular opening 6 is located in one flange of each channel support, the flange being the one located inwardly of the flange secured to the inner side of the door. The opening is so arranged that when the doors are closed. each opening will be aligned with a similar opening in a partition plate 15, the similar opening 6 being located near the midsection of the plate. As best seen in FIG. 2 a pair of channels 7 are adhesively or integrally joined to the inner side of the doors the inner side being the side opposite the from of the door. A circular disc of ferromagnetic material 8 is placed and held adhesively in this opening. Alternatively the doors can be closed by a latch 14 of the type found in brief or dispatch cases. (see FIG. 7). The doors are opened by placing a knob 15 on each door somewhat above the latch 14. The channels 7 serve as supports for foldable chairs 9 which easily slide therein. The channels are adhesively secured or made integral with the door. If necessary, to prevent the chairs from shifting if the length of the chairs is less the length of the channels, a snug fitting slat 26 can be placed in the channels adjacent the chair end. Ordinarily, when the container is closed, cover 2 will hold the chairs in place. The same device, namely slat 26a could be also used to prevent the table from sliding. The cover when closed is placed so that its inner end slight overlies the doors, and is closed by a snap lock type latch. 10. (See FIGS. 2 and 4). On about the center of the inner rim is affixed a tongue 10a. On one of the doors adjacent its outer edge a solid rectangular casing 11 having a two aligned slots 11a is secured. Projecting from these slots are spring plates 20. These plates are spaced such that when the cover closes the tongue will fit between the alightly yielding spring plates. Alternatively, instead of spring plates, magnetic plates could also be used. The doors and cover are hingedly connected to the container by attaching the door and the cover to the container with a segment of flexible plastic 19 at the juncture of the doors and cover with the back side of the container. Underlying the foldable doors a foldable table 17 is inserted between a pair of channels 18 adhesively or integrally secured to the back side of the container. Between the channels for the doors and table the aforementioned place 15 is adhesively secured to the channels for the table. The partition plate as clearly shown in FIG. 5, and discussed in the Summary separates the channel support for the foldable table from the channel supports for the foldable chairs. The aforesaid another opening 6 is located in this partition plate, each opening being aligned with the openings in the aforesaid channels. While the container has been illustrated for storage of foldable chairs and a table, nevertheless the container can be made more spacious so as to contain a wide assortment of other articles, such as apparel, books, etc. by lengthening the doors and the back wall of the container, that is by increasing its depth, (See amended FIG. 1) and omitting the channels beyond the region where the foldable chairs and table are stored. Number the pages in the specification starting with the page having the title as the first page. To facilitate transport, wheels 21 can be attached to the back side adjacent the bottom. To give added support an additional plate 22 is bolted to then back side. The wheels can be mounted on swivels 23. On the top back side a gripping means is fashioned by scalloping out from he back plate support two spaced oval openings 24 such that a strip 25 bridges the middle of the openings.

While a detailed description of an embodiment of the invention has been made, it should be understood that various changes and modifications obvious to those skilled in the art could be made without departing from the scope of the invention as defined by the appending claims.

I claim:

1. An injection molded plastic container and goods transport assembly comprising:

a) a substantially rectangularly shaped container having a hinged cover, a pair of hinged doors having top and bottom edges, a back side and a closed end opposite said cover, b) supports mounted on an inner side of said door, c) a support mounted within said back side of said container, said support underlying said supports, said support and said supports extending downwardly in a vertical direction from said top edges of said doors, d) a partition plate adhesively fixed on said support separating said support from said supports, wherein the transport of goods comprise:

a) a foldable chair insertable in each said supports and b) a foldable table insertable in said support.

2. An assembly as in claim 1 wherein said plastic container is made of a thermosetting, rigid, light weight plastic and said doors and cover are hinged by joining a flexible material at a juncture of said doors and cover with said back side of said container, said doors when in closed position being closely adjacent each other, said cover overlapping said doors.

3. An assembly as in claim 2 wherein said each of said supports is in the form a pair of spaced channels, said channels having a first flange adhesively secured to said inner side of said doors and a second flange inwardly of said first flange, a circular opening in said second flange in one channel of each said support, said opening being arranged such that when said doors are closed, said circular opening will be aligned with a second similar opening located near a midsection of said partition plate, a high intensity magnetic disc adhesively fixed in said opening, said magnets bonding with ferromagnetic material in said second similar opening, said magnet and ferromagnetic material clamping the door shut when the container is in transport or storage, and said cover in closed position is secured to one of said doors by a latching means.

4. An assembly as in claim 3 wherein channels are made integral with said innerside of said doors, said channels extending horizontally around said bottom edges, said cover has an inner rim, a tongue fixed thereon, one of said doors having a rectangular casing adjacent an outer edge of said door, spring plates projecting from slots in said casting such that when said cover closed said tongue is latched between said plates.

5. An assembly as in claim 2 wherein said doors in closed position are secured by a spring lock, said doors being unlocked by pressing on said spring lock, said doors being opened by a knob on each door located above said lock.

6. An assembly as in claim 3 wherein said doors have a knob on an outer side of each door for opening said door.

7. An assembly as in claim 3 wherein said support is a pair of channels fixed within and on a back side of said container.

8. An assembly as in claim 3 wherein said support is made integral with said back side of said container.

9. An assembly as in claim 2 wherein said foldable chairs and said foldable table are held immobile by said overlapping cover.

10. An assembly as in claim 2 wherein said supports and said support extend downwardly in a vertical direction for a greater longitudinal distance than said chairs and foldable table and slats are placed in said supports adjacent said chairs and table to maintain immobility.

11. An assembly as in claim 10 wherein said container is dimensioned to have a depth greater than said longitudinal distance of said supports for storage and transport of additional goods.

12. An assembly as in claim 1 having means to transport said goods, said means comprising a pair of wheels attached to said back side and at said bottom edge of said container, a support plate bolted to said back side and gripping means formed in said support plate near said top edge.

13. An assembly as in claim 12 wherein said wheel are mounted on swivels and said gripping means includes two shipped oval openings having a middle with a strip of material bridging said middle.

\* \* \* \* \*